(12) United States Patent
Burnham

(10) Patent No.: US 6,406,510 B1
(45) Date of Patent: Jun. 18, 2002

(54) METHODS FOR TREATING WASTEWATER SLUDGE

(75) Inventor: Jeffrey C. Burnham, Naples, FL (US)

(73) Assignee: Unified Environmental Services Group, LLC, Edison, NJ (US)

(*) Notice: Subject to any disclaimer, the term of this patent is extended or adjusted under 35 U.S.C. 154(b) by 0 days.

(21) Appl. No.: 09/714,458

(22) Filed: Nov. 17, 2000

Related U.S. Application Data

(60) Provisional application No. 60/176,021, filed on Jan. 14, 2000, and provisional application No. 60/169,962, filed on Dec. 9, 1999.

(51) Int. Cl.$^7$ .............................. C05F 7/00; C05F 3/04
(52) U.S. Cl. ................ 71/11; 71/25; 71/31; 71/37; 71/41; 71/63; 71/64.03; 71/12
(58) Field of Search ..................... 71/11, 25, 63, 71/41, 37, 31, 64.03, 12

(56) References Cited

U.S. PATENT DOCUMENTS

| | | | | |
|---|---|---|---|---|
| 3,966,450 A | * | 6/1976 | O'Neill et al. | 71/15 |
| 4,108,771 A | * | 8/1978 | Weiss | 210/50 |
| 4,180,459 A | | 12/1979 | Zievers | 210/10 |
| 4,270,279 A | | 6/1981 | Roediger | 34/9 |
| 4,377,486 A | * | 3/1983 | Barrick et al. | 210/712 |
| 4,405,354 A | * | 9/1983 | Thomas, II et al. | 71/21 |
| 4,500,428 A | | 2/1985 | Lynch et al. | 210/609 |
| 4,554,002 A | | 11/1985 | Nicholson | 71/12 |
| 4,781,842 A | | 11/1988 | Nicholson | 210/751 |
| 4,902,431 A | | 2/1990 | Nicholson et al. | 210/751 |
| 4,966,706 A | | 10/1990 | Gregor | 210/609 |
| 4,997,572 A | | 3/1991 | Wurtz | 210/710 |
| 5,051,031 A | | 9/1991 | Schumacher et al. | 405/129 |
| 5,125,951 A | | 6/1992 | Lahoda et al. | 71/12 |
| 5,135,664 A | | 8/1992 | Burnham | 210/751 |
| 5,186,840 A | | 2/1993 | Christy et al. | 210/709 |
| 5,252,116 A | | 10/1993 | Markham et al. | 71/13 |
| 5,259,977 A | | 11/1993 | Girovich et al. | 210/770 |
| 5,275,733 A | | 1/1994 | Burnham | 210/609 |
| 5,342,442 A | | 8/1994 | Nechvatal et al. | 106/409 |
| 5,346,527 A | | 9/1994 | Rehbein et al. | 71/12 |
| 5,385,673 A | * | 1/1995 | Fergen | 210/710 |
| 5,401,402 A | | 3/1995 | Christy et al. | 210/205 |
| 5,409,605 A | | 4/1995 | Haley et al. | 210/199 |
| 5,419,839 A | | 5/1995 | Haley et al. | 210/751 |
| 5,500,044 A | | 3/1996 | Meade et al. | 106/697 |
| 5,554,279 A | | 9/1996 | Christy | 210/149 |
| 5,580,458 A | | 12/1996 | Yamasaki et al. | 210/609 |
| 5,593,590 A | | 1/1997 | Steyskal | 210/603 |
| 5,593,591 A | | 1/1997 | Ohsol et al. | 210/609 |
| 5,603,842 A | | 2/1997 | Whitaker et al. | 210/743 |
| 5,618,442 A | | 4/1997 | Christy | 210/742 |
| 5,635,069 A | | 6/1997 | Boss et al. | 210/609 |
| 5,669,969 A | | 9/1997 | Meade et al. | 106/697 |
| 5,681,481 A | | 10/1997 | Christy et al. | 210/723 |
| 5,783,073 A | | 7/1998 | Christy et al. | 210/205 |
| 5,853,450 A | | 12/1998 | Burnham et al. | 71/9 |
| 5,853,590 A | | 12/1998 | Burnham | 210/609 |
| 5,876,613 A | | 3/1999 | Bonnin et al. | 210/609 |
| 5,906,750 A | | 5/1999 | Haase | 210/727 |
| 5,916,448 A | | 6/1999 | Fergen | 210/723 |

\* cited by examiner

Primary Examiner—Chhaya D. Sayala
(74) Attorney, Agent, or Firm—Heller Ehrman White & McAuliffe LLP

(57) ABSTRACT

This invention relates to methods for treating wastewater sludge cake with acid and calcium carbonate under acidic, low heat conditions to produce a stable, soil-like or granular, finished product containing calcium carbonate, useful as a nitrogen fertilizer, synthetic soil component or soil conditioner for pH control.

19 Claims, 3 Drawing Sheets

METHODS FOR TREATING WASTEWATER SLUDGE

This application claims the benefit of U.S. Provisional Application No. 60/169,962, filed Dec. 9, 1999, and U.S. Provisonal Application No. 60/176,021, filed Jan. 14, 2000.

BACKGROUND

1. Field of the Invention

This invention relates to methods for the treatment and stabilization of municipal wastewater sludge, and, in particular, to methods for treating wastewater sludge cake with acid and calcium carbonate to produce a finished product, useful as a fertilizer, a soil conditioner or a synthetic soil component.

2. Description of the Background

Methods for the treatment of wastewater sludge to economically and safely produce a useful, soil-like end product, such as fertilizer, are needed in order to deal with the large amounts of wastewater sludge being produced by municipalities and industries. Alkaline stabilization and advanced alkaline stabilization are two conventional municipal wastewater sludge processes that have been used to produce an alkaline a soil-like end product used as a soil conditioner to control soil pH. Although the products of these processes may qualify as either Class A or Class B with regard to pathogen standards per 40 C.F.R. 503 Rule of the USEPA, the end products and processes have the negative characteristic of emitting significant amounts of ammonia and amines, such as trimethyl amine or diethyl amine both during processing as well as from the final product. As a result, the end products and processes for making them are clearly nuisances. For example, the laws of the State of New Jersey with regard to odor emissions make it very difficult to distribute such products for agricultural usage within the state.

SUMMARY OF THE INVENTION

The present invention overcomes the problems and disadvantages associated with current strategies and designs and provides methods for treating wastewater sludge cake with acid and calcium carbonate or calcium carbonate-containing materials under acidic, low heat conditions to produce a granular or soil-like, finished product containing calcium carbonate.

The present invention modifies or improves conventional sludge stabilization processes in that the undesirable emission of ammonia and amines does not occur during processing or upon product completion or storage. The present invention also introduces a group of oxidant and non-oxidant odor control agents both prior to the addition of the acid and after the addition of the acid. These odor control agents include, for example, activated copper sulfate, ferrous sulfate, and other oxidants such as chlorine dioxide, stabilized liquid chlorine dioxide, hydrogen peroxide, sodium hypochlorite, ozone or combinations thereof. In addition, the invention produces a safe, odorless or nearly odorless product useful as a fertilizer, synthetic soil or soil conditioner for pH control as an ag-lime. This property is due at least in part to the calcium carbonate content of the final product. The invention also provides the advantage over traditional alkaline stabilization in that nitrogen contained within the ammonium and amines within the sludge is preserved in the product so that the nitrogen is available for agricultural use.

Accordingly, one embodiment of the invention is directed to a method for treating wastewater sludge to produce a stabilized product comprising the steps of mixing wastewater sludge comprising preferably between 10% and 40% solids with an acid to form an acid-sludge mixture, optionally adding an oxidant to assist with odor control of the mix, mixing the acid-sludge mixture with an amount of a material containing calcium carbonate, wherein the amount is such that the pH of the mixture does not exceed a safe handling pH of between 6 and 9, preferably no more than 8, and drying the mixture to produce the stabilized product. Generally, when the mixture is at least pH 7.0, the carbonate is in a carbonic acid form and will not control pH as equivalent to an agricultural limestone or ag-lime.

Another embodiment of the invention is directed to a method for treating wastewater sludge to produce a stabilized product comprising the steps of mixing wastewater sludge comprising preferably between 10% and 40% solids with an amount of a material containing calcium carbonate, wherein the amount is such that the pH of the mixture does not exceed about 7.0, mixing the calcium carbonate-containing sludge with an acid to form an acid-sludge mixture, and drying the mixture to produce the stabilized product.

Another embodiment of the invention is directed to a stabilized product made by the method of the invention.

Other embodiments and advantages of the invention are set forth in part in the description which follows, and in part, will be obvious from this description, or may be learned from the practice of the invention.

DESCRIPTION OF THE INVENTION

Figure 1:
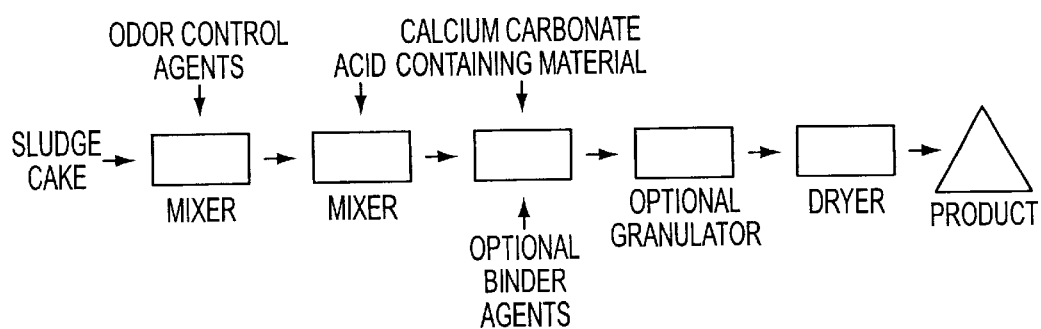
FIG. 1 Schematic of a preferred embodiment of the process of the invention.

As embodied and broadly described herein, the present invention is directed to methods for treating wastewater sludge cake with acid and calcium carbonate under acidic, low heat conditions to produce a soil-like finished product containing calcium carbonate, useful as a fertilizer, synthetic soil component or soil conditioner. The invention is also directed to products produced by these methods.

It has been surprisingly discovered that wastewater sludge can be treated so that the material is stabilized and safe wherein the treatment process produces little or no emissions of ammonia or amines from the material during mixing or after product completion. The invention includes a recipe that processes a sludge cake of preferably between 10% and 40% solids and mixes the cake with acid (e.g. hydrochloric, sulfuric, nitric and/or phosphoric). After this initial mix, the cake is further mixed with material containing calcium carbonate, being careful to ensure that the pH of the mixture is between 6 and 9, preferably less than 8. The odor emissions that occur during mixing may be controlled by the optional addition of odor control agents, oxidizing agents such as, for example, chlorine dioxide, ozone, or hydrogen peroxide, prior to or after, preferably immediately after, addition of the acid in the sludge processing.

By treating and stabilizing municipal wastewater sludge according to the invention, a desired product is produced that:

- is safe with regard to pathogens, i.e. achieves either the USEPA's Class A (preferably) or Class B standard;
- is treated under acidic conditions to minimize and prevent the emission of amines and ammonia during and after sludge processing;
- omits no significant ammonia (less than 10 ppm) into the inter-soil space or head space above the product;
- omits no significant amines (trimethyl amine, diethyl amine) (less than 2 ppm) into the inter-soil space or head space above the product;
- omits no significant dimethyl sulfide (less than 2 ppm) into the inter-soil space or head space above the product;
- is greater than 50% solids, preferably greater than 80% solids, and, more preferably, greater than 90% solids (i.e. 10% or less water);
- can be marketed as an ag-lime (calcium carbonate equivalent product) and/or as a fertilizer for the N, P, K, S (nitrogen, phosphorus, potassium and sulfur) value; and
- provides a finished product in the form of a granule or a soil-like mixture.

The present invention is the first stabilization process that uses product heating below 93° C. (200° F.) to make a product which has substantially no significant sludge odors of ammonia, amines or sulfides. The process of the invention creates a stable, microbial pathogen-safe, odorless product that can be beneficially used in homes or gardens, commercial agriculture or in synthetic soil production. The end product preferably contains greater than about 5% calcium carbonate, more preferably, greater than about 8% calcium carbonate, and most preferably, greater than about 10% calcium carbonate. Pilot production according to the invention, using about 1,000 pounds of wet weight sludge cake per batch, produced an odorless or nearly odorless finished product with the desirable characteristics listed above.

Conventional municipal sludge cake processing involves either raising the pH of the mixed material to a strongly alkaline pH such as, for example, a level above pH 11.0 as an alkaline processing step, and/or raising the temperature of the sludge cake to over 93° C. (200° F.). In contrast, the present invention is the first sludge stabilization process to be operated in acidic or nearly neutral conditions under low heat conditions that still produces a stable product which has a significant calcium carbonate (e.g. greater than 5 to 10%).

Figure 3:
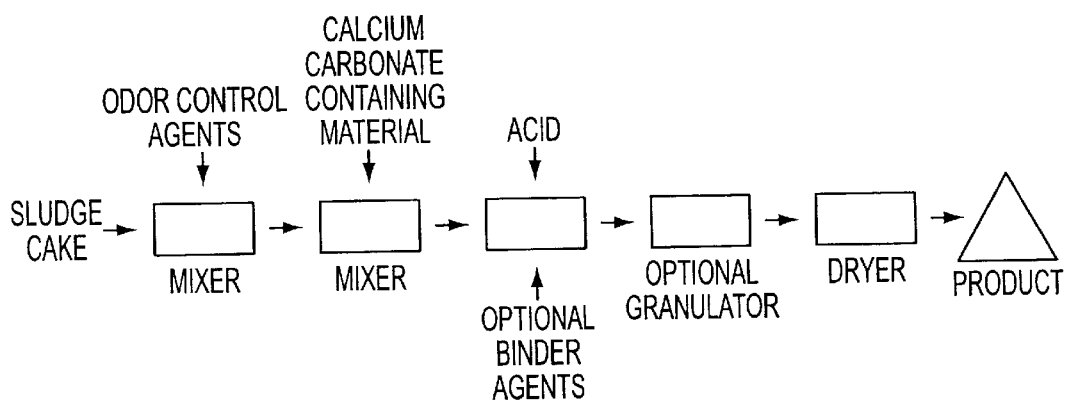
FIG. 3 Schematic showing another embodiment of the process of the invention.

A schematic of a preferred embodiment of the invention is depicted in FIGS. 1 and 3. As shown in FIG. 1, sludge cake is placed in a mixer where odor control agents may optionally be added. Acid is added to the sludge and further mixing occurs. Calcium carbonate-containing material is then added, and optionally, binder agents. The calcium carbonate-containing material may be selected from the group comprised of calcium carbonate, commercial ag-lime, Class C fly ash, Class F fly ash, cement kiln dust, lime kiln dust, wood ash, fluidized bed ash, lime-injected multistage burner ash, soil or dredgings. Although the actual amount of calcium carbonate-containing material in the finished product is determined by the level of acid so that the pH is between 6 and 9, preferably less than 8, it is preferably desirable that this percent is greater than 5%. The mixture may be granulated as desired. To assist with formation of hard granules a binder agent such as, for example, lignin or molasses may be added to the mix. Alternatively, wastewater sludge comprising preferably 10% to 40% solids is mixed with an amount of a material containing calcium carbonate, wherein the amount is such that the pH of the mixture is between 6 and 9, preferably less than 8 (FIG. 3). The calcium carbonate-containing sludge is mixed with an acid to form an acid-sludge mixture.

The resulting mixture from either alternative is then dried to produce the finished product. Drying may be accomplished by exposing the mixture to mechanical drying by fluidized bed, rotary drum, infrared or microwave processing. The initial mixer permits the addition of one or more odor control agents which minimize the generation of odors, especially sulfides, that are created as when sulfuric acid is added in the second mixing step. The odor control agents are comprised of a group which may include stabilized liquid chlorine dioxide, activated copper sulfate, ferrous sulfate, and other oxidants such as hydrogen peroxide, sodium hypochlorite and ozone. These agents have the additional advantage of disinfecting the sludge cake material in the mixing process. The acid addition step may utilize one or more acids such as, for example, sulfuric acid, sulfamic acid, phosphoric acid, hydrochloric acid, nitric acid and/or acetic acid, propionic acid, butyric acid or a combination thereof.

Figure 2:
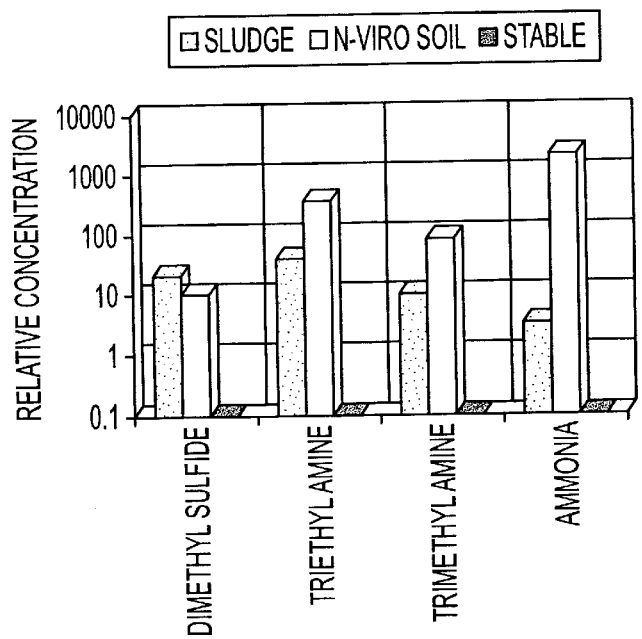
FIG. 2 Graph showing an absence of odorants emitted by products made by the process of FIG. 1.

FIG. 2 is a graph that depicts the odorant production of a typical unprocessed sludge (sludge), an alkaline stabilized product (N-Viro Soil) and the product of this invention (STABLE Stabilized Thermoprocessed Acidified Biosolid with Lime and Essential Nutrients). The data in FIG. 2 show the lack of specific odorants (as detected by instrumentation) emitted by the product (STABLE) made by the process of the invention. In addition, the human nose is unable to detect sludge odors (amines or sulfides) emitted from the finished product. Very little ammonia is detected (as determined by smell) in the finished product. This is significant in view of regulations making the use of odorous products difficult. The material produced by the invention (which may be odor-free or nearly so) should prove acceptable to the wastewater industry, the consumer, the public and the regulatory community.

Processes performed according to preferred embodiments of the invention meet USEPA 40 C.F.R. Part 503 Class A pathogen standards. For example, the following two embodiments have achieved these standards in operations at the pilot scale level.

1. One such preferred embodiment for achieving Class A product designation is based upon the exothermic reaction of concentrated acids that have been mixed with the sludge with various compounds in the calcium carbonate-containing admixture (e.g. calcium oxide and calcium hydroxide) as well as reactions with compounds present in the sludge cake (i.e. ammonia or ammonium ion). The calcium-carbonate containing material may be supplemented with one or more oxidants such as, for example, calcium oxide, calcium hydroxide, sodium hydroxide, potassium hydroxide, ammonium hydroxide or other similar oxide or hydroxide compounds to assist in achieving the necessary exothermic reaction. The exothermic reactions may be achieved using one or more acids, e.g. sulfuric, sulfamic, phosphoric, hydrochloric or nitric acids. These exothermic reactions are coupled with the production of heat of hydration from the reaction of the acid with the water present in the sludge cake. The amount of acid and admixture is adjusted so that temperatures of over 75° C. are achieved. This allows the mixture to achieve the time/temperature requirements published by the USEPA in 40 C.F.R. Part 503 so that the pathogen kill component of the 503 rule is met. This time/temperature requirement is met by application of the following formula: $T (\text{minutes}) = 1.896 \times 10^{11} / 10^{0.14C}$. The value C is the temperature in degrees Celsius.

Figure 4:
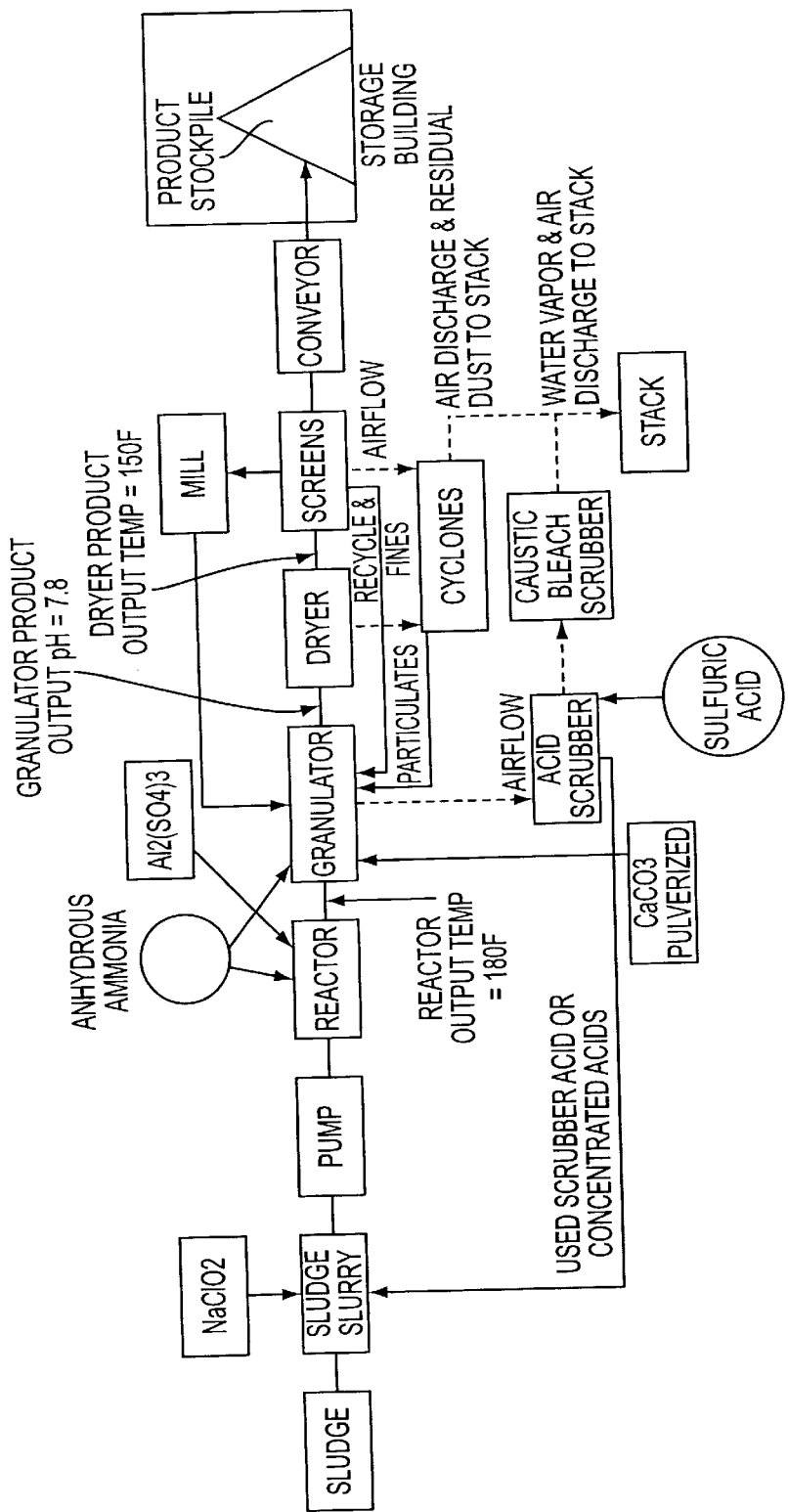
FIG. 4 Schematic showing another embodiment of the process of the invention that introduces heat from the reaction of anhydrous ammonia with acid during the formation of the product but immediately prior to the introduction of the calcium carbonate containing materials.

2. Another preferred embodiment of achieving Product Class A standards, described more fully in Example 1 and illustrated in FIG. 4, involves heating the sludge acid mixture by adding sufficient anhydrous ammonia and any additional acid (e.g. concentrated sulfuric acid) such that the temperature of the mix is raised to 80° C. or greater, according to the same time/temperature requirement as described above. Such additions could occur in a mixer at atmospheric pressures or could take place under pressure as in a cross-pipe reactor as described in U.S. Pat. No. 5,984,992. The pH of the final product after addition of the calcium carbonate-containing admixture step would be preferably less than pH 8.0 so as to prevent significant ammonia emissions.

3. Another preferred embodiment for achieving Product Class A standards, described more fully in Example 1, involves heating the soil-like or granular product in a mechanical heater such that the product is maintained at a temperature of 80° C. or greater, according to the same time/temperature requirement described above. The mechanical heater may be a fluidized bed dryer, a rotary drum dryer, a infrared dryer or a microwave dryer.

When the product is dried to over 90% solids it also achieves the Option #8, which requires wastewater sludge products to be at 90% solids or greater as published in the Vector Attraction Rule of 40 C.F.R. Part 503.

The following example is offered to illustrate embodiments of the invention, and should not be viewed as limiting the scope of the invention.

EXAMPLES

Example 1

Wastewater sludge cake was received by the Hydropress biosolids treatment facility located in Phillipsburg, N.J. at 28% solids. The source of the sludge was a wastewater treatment facility processing sewage from New York City.

This sludge cake was placed into a mechanical mixer which allowed the blending of additional materials into the sludge cake. The first addition was a solution of an acidified stabilized liquid chlofine dioxide (0.5% by weight of a 10% solution). After this was blended, the second addition of an acidified activated copper sulfate (0.5% by weight of a 6% solution) was blended. The third addition was 5% by weight of concentrated sulfuric acid (93%). As soon as this was blended, an amount of calcium carbonate-containing admixture (in this example, a Class C fly ash containing less than 5% calcium oxide) was added and blended such that the pH of the mixture did not exceed pH 8.0. In this example, the amount of Class C fly ash added was 30 lbs. A final addition of 0.5% ferrous sulfate was added and blended to assist with odor control of the finished product.

The final step in the processing of this mixture was to feed the mixture into a fluidized bed dryer such that the product was heated to 85° C. (185° F.). This temperature was achieved for a period sufficient to achieve the time temperature requirement of 503 Rule Class A pathogen standard of the USEPA. In addition, because the drying achieved over 96% solids, the mixture also achieved Option 8 of the 503 Rule Vector Attraction requirement. By satisfying both provisions of the 503 Rule, the end product achieves the Class A designation. As such, it can be beneficially used in gardening, farming or in synthetic soil production. The product produced in this example caused no emission of ammonia or amine or sulfide into either the inter-soil space or into the air head space above the product.

Example 2

Wastewater sludge cake was received by the Cypress Chemical Company in Helena, AR at 28% solids. This sludge cake was vigorously mixed with sulfuric acid and then the oxidant, 50% hydrogen peroxide was added until a concentration of 500 ppm was reached in the mix. After thorough mixing this material was pumped into a Cross-pipe reactor into which was injected an amount of concentrated sulfuric acid and anhydrous ammonia sufficient to raise the temperature of the mix to 85° C. (185° F.) within the reactor. The mix was retained in the reactor at this temperature for over 16 seconds before it was discharged into a granulator. The pH of the mix was adjusted to pH 7.8 within the granulator by adding 25% by weight pulverized calcium carbonate and a small amount of additional anhydrous ammonia. The granular discharge from the granulator was dried in a rotary dryer to 98% solids. This process yielded a valuable granular product made up of 8-1-0 (N-P-K) fertilizer with 10% sulfate, about 28% ag-lime (calcium carbonate) and about 20% organic material.

Example 3

In this example, the order of addition of the alkaline material is changed such that it precedes the addition of the acid. Specifically, the sludge cake is first optionally treated with odor conditioning agents as in the Example 1. Following the blending in of this material the mixture is next treated with a calcium carbonate containing material such as a Class C fly ash. The blending in of this alkaline material will temporarily raise the pH of the mixture to above pH 7.0. The pH should be reduced as soon as possible by next adding an acid, such as hydrochloric, nitric, sulfuric or phosphoric acid, to the alkaline material such that the pH of the mixture is reduced. This pH reduction should be at least to pH 10.0 but preferably to below pH 8.0 and more preferably to between pH 6.0 and pH 7.0. The reduction of pH to these levels stops the loss of nitrogen that occurs at alkaline pHs through volatizing ammonia and amines while keeping the carbonate species for pH control. This mixture can then be dried to over 90% solids by mechanical means during which said mixture is heated to above 82° C. (180° F.) for more than 40 seconds. A diagram illustrating this method is presented in FIG. 3. The mixture when treated in this manner will achieve the USEPA's Class A pathogen standard so that the product of this Example can be used in a beneficial manner without restriction and without any public health concern.

When alkaline admixtures such as Class C or Class F fly ashes are used which contain significant amounts of calcium oxide or calcium hydroxide the amount of acid that must be added so that the final pH is reduced to below pH 8.0 and preferably below pH 7.0 and above pH 6.0 is much greater. Although this will significantly increase the cost of the STABLE process it will still result in a satisfactory product that will not emit significant amounts of ammonia or amines. The calcium carbonate containing material used in this invention may be selected from the group comprising all or some or one of the following: Class F fly ash; Class C fly ash; lime injected multistage burner ash; bed ash; wood ash; cement kiln dust; lime kiln dust; mined calcium carbonate; pure calcium carbonate; calcium carbonate containing soils or dredgings; and other calcium containing materials.

Example 4

In this example, sludge cake was treated with about 33% by weight with a Class C fly ash containing over 30% calcium hydroxide. This mixture increased in temperature to over 52° C. but not over 80° C. This temperature was maintained for over 12 hours. The pH of the mixture was increased to over pH 12.0 and this pH did not become reduced to below pH 12.0 for over 72 hours. At this point in the process significant amount of ammonia and amines emit from said mixture. This mixture was next treated by blending in a solid sulfamic acid such that the pH was reduced. The pH reduction which could be accomplished using acids, accomplished a reduction in the emission of ammonia and amines. The pH reduction improved the product odor with increasing reduction of pH to an optimum of below pH 8.0 and above pH 7.0. This soil-like mixture has a percent solids greater than 50% and may be optionally dried to a higher percent solids. Said processed mixture maintains a pH of below pH 10.0, optimally below pH 8.5 and more optimally below pH 7.5. This product can be used beneficially as a weak fertilizer, a synthetic soil component or substitute, or, because of its calcium carbonate concentration, as an agricultural liming agent (ag-lime).

Other embodiments and uses of the invention will be apparent to those skilled in the art from consideration of the specification and practice of the invention disclosed herein. All references cited or otherwise identified herein are specifically and entirely incorporated by reference. It is intended that the specification and examples be considered exemplary only, with the true scope and spirit of the invention indicated by the following claims.

What is claimed is:

1. A method for treating wastewater sludge to produce a stabilized product comprising the steps of:

mixing said wastewater sludge comprising greater than 10% solids with an acid to form an acid-sludge mixture;

mixing the acid-sludge mixture with an amount of a material containing calcium carbonate, wherein said amount is such that the pH of the mixture is less than about 8.0; and drying the mixture to produce the stabilized product.

2. The method of claim 1 wherein the acid is selected from the group consisting of sulfuric acid, sulfamic acid, phosphoric acid, hydrochloric acid, nitric acid, acetic acid, propionic acid, butyric acid and mixtures and combinations thereof.

3. The method of claim 1 further comprising the step of adding odor control agents to the sludge prior to or following the step of mixing with the acid.

4. The method of claim 3 wherein the odor control agents are oxidants selected from the group consisting of chlorine dioxide, stabilized chlorine dioxide, activated copper sulfate, ferrous sulfate, hydrogen peroxide, hydrogen peroxide, sodium hypochlorite, ozone and combinations thereof.

5. The method of claim 1 further comprising the step of adding one or more binder agents to the acid-sludge mixture.

6. The method of claim 1 further comprising the steps of granulating the mixture prior to drying.

7. The method of claim 1 wherein the step of drying comprises exposure of the mixture to mechanical drying by fluidized bed, rotary drum, infrared or microwave processing.

8. The method of claim 1 wherein the calcium carbonate-containing material is selected from the group: calcium carbonate, Class C fly ash, Class F fly ash, cement kiln dust, lime kiln dust, wood ash, fluidized bed ash, lime-injected multistage burner ash, soil or dredgings.

9. The method of claim 1 further comprising the step of heating.

10. The method of claim 9 wherein the step of heating can occur by exothermic reaction during the mixing of the acid-sludge mixture with the calcium carbonate-containing material.

11. The method of claim 9 wherein the step of heating can occur by exothermic reaction during the mixing of the acid-sludge mixture with anhydrous ammonia and, optionally, additional concentrated acid.

12. The method of claim 9 wherein the step of heating takes place during the step of drying.

13. The method of claim 9 wherein the step of heating comprises raising the temperature of the mixture to a temperature for a time specified by the formula $T \text{ (minutes)} = 1.896 \times 10^{11}/10^{0.14t}$ wherein t is temperature in degrees Celsius.

14. A stabilized product made by the method of claim 1 wherein the product contains greater than about 8% calcium carbonate.

15. The product of claim 14 which contains greater than about 1% fertilizer nutrients and greater than about 10% organic material.

16. The product of claim 15 wherein the fertilizer nutrients comprise nitrogen, phosphorous, sulfur or combinations thereof.

17. The product of claim 15 wherein the fertilizer contains greater than 8% fertilizer nutrients.

18. The product of claim 15 wherein the fertilizer contains less than 12% fertilizer nutrients.

19. A method for treating wastewater sludge to produce a stabilized product comprising the steps of:

mixing said wastewater with an amount of a material containing calcium carbonate, wherein said amount is such that the pH of the mixture is less than about 8.0;

mixing the calcium carbonate-containing wastewater mixture with an acid to form an acid-sludge mixture; and drying the acid-containing mixture to produce the stabilized product.

* * * * *